Patented Feb. 13, 1923.

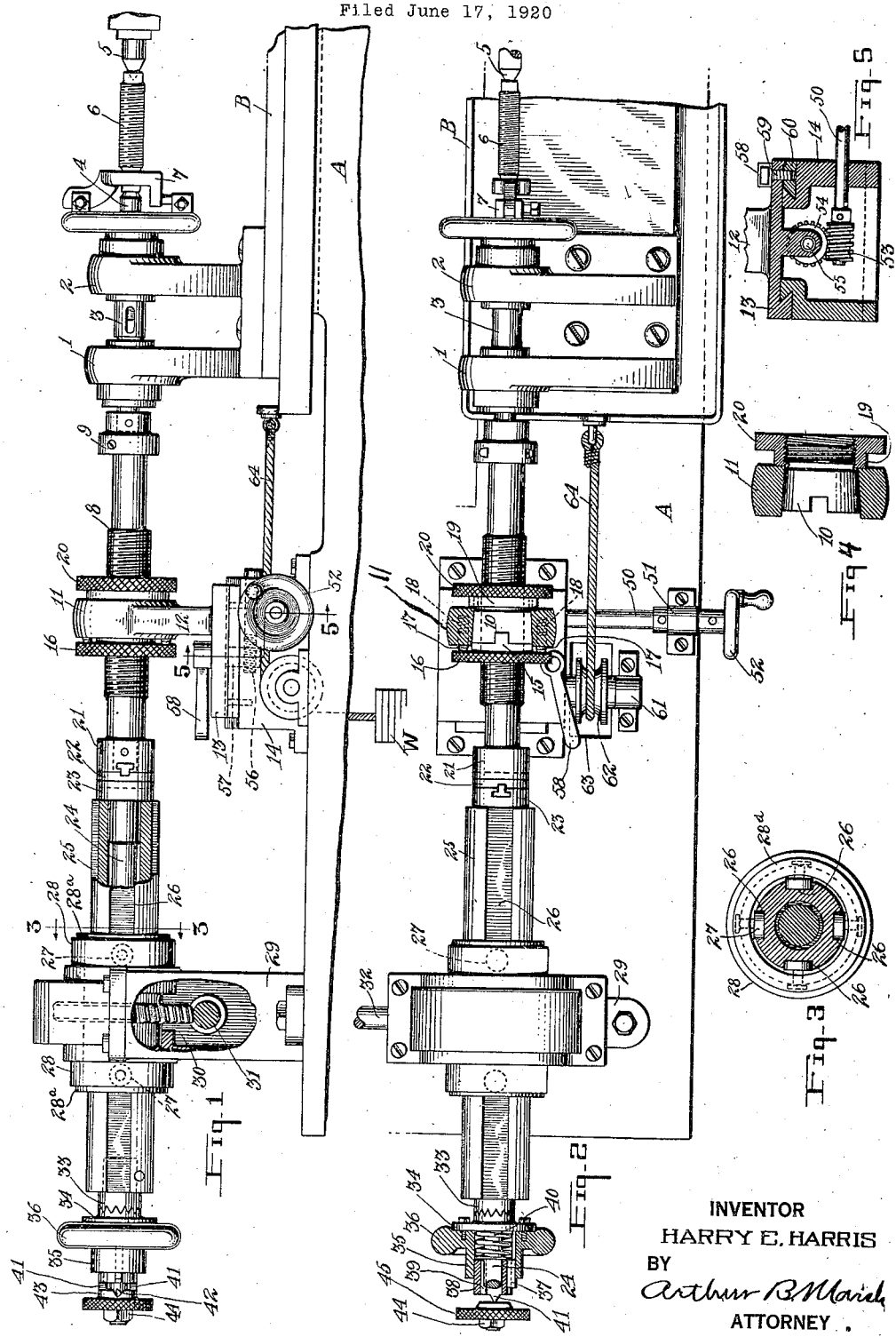

1,445,137

UNITED STATES PATENT OFFICE.

HARRY E. HARRIS, OF BRIDGEPORT, CONNECTICUT.

FEEDING MECHANISM.

Application filed June 17, 1920. Serial No. 389,706.

*To all whom it may concern:*

Be it known that HARRY E. HARRIS, a citizen of the United States, residing at 1047 Broad St., Bridgeport, in the county of Fairfield and State of Connecticut, has invented certain new and useful Improvements in Feeding Mechanism, of which the following is a specification.

This invention seeks to provide an improved feed mechanism, being more particularly designed as a feed mechanism for a thread grinding machine though it will be evident from a further description thereof that certain features may find utility in other relationships and in connection with other machines.

More particularly it provides means controlled by a lead or master screw so designed as to effectively eliminate lost motion whereby the work may be presented to the grinding wheel or tool in proper position during both directions of its traverse, thus not only eliminating an idle traverse but also causing more perfectly finished and accurate work.

Means is also provided for insuring the transmission to the master screw of purely rotary motion from the driving mechanism, this mechanism also being designed so as to be readily unclutched from the master screw by the operator, or automatically in case of unusual resistance encountered in its operation.

Means is also provided for effecting a delicate adjustment of the work to present the same accurately to the tool in the position desired.

These and other features of the invention and advantageous details and combinations of parts will appear from a more complete description of one embodiment of this invention shown in the accompanying drawings in which—

Fig. 1 is a front elevation partly in section and partly broken away of a feed mechanism as designed for a thread grinding machine.

Fig. 2 is a plan partly in section of the same mechanism.

Fig. 3 is a cross section on line 3—3 of Fig. 1.

Fig. 4 is a sectional detail of the lead or master screw nut and

Fig. 5 is a section on line 5—5 of Fig. 1.

A represents a portion of the machine frame slidably carrying on the upper face thereof a pan B carrying at one end thereof on suitable brackets bearings 1 and 2 preferably of the Schiele type arranged in opposed relation to prevent all endwise play of live spindle 3 journaled therein, spindle 3 being provided at its inner end over the pan B with a live center 4 between which and a dead center 5, the work 6 may be placed,—a dog 7 of any suitable construction being employed to clamp the work for rotation with the center 4. In alignment with the shaft 3 is mounted the lead or master screw 8 which may be clamped rigidly to the shaft 3 and in continuity with the work 6 by means of the collar 9. The screw 8 is threaded through a taper nut 10 fitting within the mating tapered bearing 11 carried by an upstanding arm 12 of a slide 13 supported by longitudinal undercut guides on the upper surface of a casing 14 bolted to the frame A. A second threaded member 15 interfitting by means of suitable tongues and grooves with member 10 to prevent relative rotation thereof, is provided with a knurled head 16. Pins 17 seated within sockets in the bearing 11 are spring pressed outwardly therefrom by coil springs 18 and bear at their outer ends against the inner face of the head 16, this mechanism serving to separate the members 10 and 15 to take up play between the threads of the master screw and the internal threads of the nut members 10 and 15. At the opposite end member 10 is screw threaded for engagement by a tightening nut 19 having a knurled head 20 by which means member 10 may be clamped securely within the tapered bearing 11. The outer end of screw 8 has fast thereto the inner member 21 of a full floating coupling, member 21 having a slidable dovetailed connection with a disc 22 which in turn has a similar dovetailed connection at right angles to its connection with member 21 with the disc portion 23 formed on the inner end of a shaft 24. Shaft 24 is journaled within a hollow shaft or sleeve 25 which is provided with four equidistant longitudinal slots 26 therein in which rollers as 27 carried by a pair of spaced collars 28ᵃ find bearing, these collars being rigid with a sleeved spindle 28 journaled in a hollow gear box 29 fixed to the frame A. Between the collar portions 28ᵃ a worm wheel 30 is fixed to the hollow spindle 28 and meshing therewith is a worm 31 carried by a shaft 32 by which the worm wheel 30, sleeve 28 and the hollow shaft 25 may be rotated. At its outer end hollow shaft 25 carries a toothed clutch ring 33 adapted to engage a similar toothed ring 34 made fast to a sleeve 35 having integral therewith a hand wheel 36. Slidably keyed by means of a key 37 within the sleeve 35 is a second short sleeve 38 which in turn is slidably keyed by the key 39 to the shaft 24. A coil spring 40 bears between the inner end of the short sleeve 38 and the toothed clutch member 34 to project sleeve 35 inwardly to engage the clutch members 33 and 34. The outer end of sleeve 38 carries a pair of V shaped projections as 41 arranged to fit mating notches 42 in a disc 43 rotatable on the shaft 24 and retained thereon by a nut 44 threaded on the extreme end thereof, the disc 43 having a knurled flange 45 thereon.

Means are provided for adjusting the work together with the master screw lengthwise in order to bring the work in proper position relative to the grinding tool so that the latter may properly catch the thread, this means consisting of a shaft 50 journaled within the box 14 and in a bearing 51 on the frame A and carrying at its outer end a hand wheel 52 and at its inner end a worm 53. Worm 53 meshes with a worm wheel 54 carried by a shaft 55 journaled longitudinally of the box 14, this shaft having a threaded portion 56 engaging a lug 57 depending from the slide 13. For the purpose of locking the slide 13 in position a handle 58 fixed at the upper end of a screw 59 has been provided, this screw engaging at its lower end in a clamping wedge block 60 which acting against the undercut portion of the guideway serves to lock slide 13 in position. Journaled in bearings 61 on the frame A is a stub shaft carrying a guide pulley 62, frame A being provided with a slot 63 beneath said guide pulley through which may pass a cable 64 attached at its upper end to the pan B and at its lower end to a counter weight W this counter weight being of sufficient size to overcome the static friction of the pan B on its slideway on frame A.

Operation: The work to be operated upon is fixed between the live and dead centers 4 and 5 in the usual manner. The master screw is made fast as by a set screw in the collar 9 on the rear end of the spindle 3, the mating nut portions 10 and 15 having been assembled thereon and drawn into engagement with the portion 11 to prevent rotation thereof, by means of the nut 19. The opposite end of the master screw is fixed within the member 21 of the coupling. Having loosened the clamping lever 58 hand wheel 52 is rotated sufficiently to adjust the work longitudinally until the threads thereof are presented properly to the grinding wheel edge or other tool. This having been effected handle 58 is turned to lock the slide 13 in adjusted position. The collar 43 having been turned so that the projections 41 ride out from notches 42, the spring 40 moves the clutch element 34 into clutching engagement with the clutch 33 thus coupling the hollow shaft or sleeve 25 for rotation to the shaft 24 to which the floating coupling member 23 is fast. In this position of the parts the plungers 17 acting against the flange 16 of the nut portion 15, crowd the lead screw to the left into firm engagement with the threads of the nut members, the weight W acting through the cable 64 supplementing this action. The shaft 32 is now rotated, which, acting through the worm 31 and gear 30 rotates the hollow spindle 28, the bearing rollers 27 thereon engaging within the guideways 26 imparting rotation to the sleeve 25 and through the clutch elements 33 and 34 to the shaft 24 and thence through the floating coupling to the screw 8. Rotation of the screw 8 acting against the spindle 3 slides the pan B on its guideways at the same time rotating the work, following exactly the form of the screw 8. As soon as the work has traversed the distance desired past the tool, the rotation of shaft 32 is reversed, this action reversing the direction of rotation of master screw 8 and therefore both the direction of rotation and the traverse of the work 6, at the same time however, the work being held at its extreme left hand position allowed by the engagement of the threads of the master screw and the nut members 10 and 15. The work is therefore presented to the tool in the same relative position at both directions of traverse so that cutting may be accomplished continuously. This not only saves time by eliminating an idle traverse of the work past the tool but a continuous grinding or cutting working in opposite directions appears to give a keener cutting action and a smoother finish than when working in one direction only. The floating coupling connection between the shaft 24 and the lead screw provides that none except torsional forces shall be transmitted, the free relative lateral sliding of the central member 22 at right angles relative to the mating parts 21 and 23 insuring this action.

The shaft 24 may be unclutched from its driving mechanism by turning the collar 43 by hand until the projections 41 register with the notches 42 therein. The operator may then turn the shaft 24 and consequently the lead screw freely as by manipulation of the hand wheel 36.

During the normal operation of this mechanism should any obstructions offer usual resistance to the feeding of the work, the tooth formation of the clutch elements 33 and 34 will serve to force the element 34 out of clutching engagement against the force of the spring 40. Such action for example might take place if the machine being set for left hand threads, right hand threads were being ground.

It is intended that reversals of rotation of the shaft 32 to change the direction of rotation and feed of the work shall be accomplished automatically but as the particular reverse mechanism form no part of this invention no such mechanism has been here shown.

When it is desired to change lead screws, the set screws holding the parts 9 and 21 at either end thereof are released and the clamping nut 20 turned back to free the nut members 10 and 15 from the member 11. The sleeve 25 may then be pushed back from the end of the screw 8 thus freeing that end whereupon the lead screw may be readily removed.

Having thus described one embodiment of this invention, though it should be recognized that it is not limited thereto but that many changes might be made therein without departing from its spirit or scope, what is claimed is:

1. In a feed mechanism, a lead screw, means for fixing work rigidly with said screw, a nut for engaging the threads of said screw, means for rotating said screw, and means urging said screw and work axially in one direction against said nut regardless of the direction of rotation of said screw.

2. In a feed mechanism, a lead screw, a shaft fixed thereto in substantial alignment and free to move axially therewith, and means including a slip clutch for rotating said shaft.

3. In a feed mechanism, a sleeve provided with guideways longitudinally thereof, a spindle surrounding said sleeve and provided with bearing members engaging in said guideways, a shaft journalled in said sleeve, clutch mechanism for clutching said shaft and sleeve for simultaneous rotation, and means for rotating said spindle.

4. In a feed mechanism, a sleeve provided with guideways longitudinally thereof, a spindle surrounding said sleeve and provided with bearing members engaging in said guideways, a shaft journalled in said sleeve, a clutch mechanism for clutching said shaft and sleeve for simultaneous rotation, means allowing said clutch to slip under abnormal resistance to the rotation of said shaft, and means for rotating said spindle.

5. In a feed mechanism, a work holding spindle, a rotatable and axially movable drive shaft, a lead screw interposed between said spindle and shaft, a nut engaging said lead screw and means for moving said nut to provide a fine axial adjustment of work carried by said spindle.

6. In a feed mechanism, a work holding spindle, a lead screw fixed rigidly at one end thereto, a drive shaft, and a floating coupling between said drive shaft and the opposite end of said screw.

7. In a feed mechanism, a lead screw, means for attaching work to said lead screw, a pair of members comprising a shaft and a sleeve through which said shaft passes, means preventing relative rotary motion between said members but permitting relative axial motion, a floating coupling between one of said members and said lead screw, and means to rotate the other of said members.

8. In a feed mechanism, a lead screw, means for attaching work to said lead screw, a pair of members comprising a shaft and a sleeve through which said shaft passes, means preventing relative rotary motion between said members but permitting relative axial motion, a slip clutch between one of said members and said lead screw, and means to rotate the other of said members.

9. In a feed mechanism, a lead screw, means for attaching work to said lead screw, a pair of members comprising a shaft and a sleeve through which said shaft passes, means preventing relative rotary motion between said members but permitting relative axial motion, a slip clutch and a floating coupling between one of said members and said lead screw, and means to rotate the other of said members.

10. In a feed mechanism, a lead screw, a normally fixed nut having threaded engagement with said screw, a pair of members comprising a shaft and a sleeve through which said shaft passes, one of said members being coupled to said lead screw, means preventing relative rotary movement between said members while permitting relative axial movement, means for urging said screw axially in one direction to take up lost motion with said screw, and means for effecting adjustment of said nut axially of said screw.

11. In a feed mechanism, a lead screw, a two part nut engaging the threads of said lead screw, means urging said parts relatively axially of said screw to take up lost motion between said nut and screw, and means urging said screw axially in one direction against said nut.

12. In a feed mechanism, a lead screw, a two part nut engaging the threads of said lead screw, means urging said parts relatively axially of said screw to take up lost motion between said nut and screw, and means for adjusting said nut in a direction axially of said screw.

13. In a feed mechanism, a lead screw, a two part nut engaging the threads of said lead screw, means urging said parts relatively axially of said screw to take up lost motion between said nut and screw, means for adjusting said nut in a direction axially of said screw, and means for fixing said nut in adjusted position.

14. In a feed mechanism, a lead screw, a two part nut engaging the threads of said lead screw, means urging said parts relatively axially of said screw to take up lost motion between said nut and screw, means urging said screw axially in one direction against said nut, and means for adjusting said nut in a direction axially of said screw.

15. In a feed mechanism, a slide, live and dead centers carried by said slide for rotatably carrying work, a lead screw for rotating said live spindle, a nut engaging said lead screw whereby rotation of said screw moves said slide, and means urging said slide axially of said screw in one direction.

16. In a mechanism of the class described, means for supporting a screw for simultaneous rotation and traverse relative to a tool, and means for ensuring the same relative engagement between the tool and screw on both directions of relative rotation and traverse.

17. In a mechanism of the class described, means including a lead screw and a cooperating nut for supporting a screw for simultaneous operative rotation and traverse in opposite directions relative to a tool, and means for urging said lead screw axially in one direction against said nut to ensure the same relative engagement between the tool and screw on both directions of rotation and traverse of the screw.

18. In a mechanism of the class described, means for supporting a member for simultaneous rotation and traverse relative to a tool, and means for ensuring the same relative engagement between the tool and member on both directions of rotation and traverse.

In testimony whereof he affixes his signature.

HARRY E. HARRIS.